United States Patent
Manoogian et al.

(10) Patent No.: US 7,250,902 B2
(45) Date of Patent: Jul. 31, 2007

(54) METHOD OF GENERATING ACCURATE ESTIMATES OF AZIMUTH AND ELEVATION ANGLES OF A TARGET FOR A PHASED—PHASED ARRAY ROTATING RADAR

(75) Inventors: David V. Manoogian, Lynnfield, MA (US); Gerald M. Pitstick, Woburn, MA (US); John Cangeme, Carlisle, MA (US)

(73) Assignee: Raytheon Company, Waltham, MA (US)

( * ) Notice: Subject to any disclaimer, the term of this patent is extended or adjusted under 35 U.S.C. 154(b) by 183 days.

(21) Appl. No.: 11/184,653

(22) Filed: Jul. 19, 2005

(65) Prior Publication Data

US 2007/0018882 A1    Jan. 25, 2007

(51) Int. Cl.
  *G01S 13/44*   (2006.01)
  *G01S 3/72*    (2006.01)
(52) U.S. Cl. .................. 342/154; 342/80; 342/149; 342/158; 342/194
(58) Field of Classification Search .......... 342/80, 342/154
  See application file for complete search history.

(56) References Cited

U.S. PATENT DOCUMENTS

| | | | |
|---|---|---|---|
| 4,992,796 A | 2/1991 | Apostolos | |
| 5,017,927 A | 5/1991 | Agrawal et al. | |
| 5,831,570 A | 11/1998 | Ammar et al. | |
| 5,986,605 A | 11/1999 | Priebe et al. | |
| 6,404,379 B1 * | 6/2002 | Yu et al. | 342/80 |
| 6,618,008 B1 | 9/2003 | Scholz | |
| 6,680,687 B2 | 1/2004 | Phelipot | |
| 6,801,156 B1 * | 10/2004 | Wasiewicz | 342/95 |

* cited by examiner

*Primary Examiner*—Thomas H. Tarcza
*Assistant Examiner*—Matthew Barker
(74) *Attorney, Agent, or Firm*—John H. Pearson, Jr., Esq.; Walter F. Dawson, Esq.; Pearson & Pearson, LLP.

(57) ABSTRACT

A method and apparatus for generating accurate estimates of a radar target's azimuth and elevation angles for a phased-phased array rotating radar. Scan modulated coherently integrated (SMCI) monopulse curves are generated from a measured one-way transmit antenna pattern and three receive antenna patterns. The SMCI monopulse curves are calculated in advance for the expected beam steers. To utilize the SMCI monopulse curves, two-way Sum, Delta-Azimuth and Delta-Elevation target returns are coherently integrated, the target's monopulse ratios calculated, and the SMCI monopulse curves or polynomials used to calculate the target's U-offset and V-offset sine-space angles, which are added to the radar's beam steer to get an improved estimate of the target's sine-space angular position denoted as $U_{tgt}$ and $V_{tgt}$. A coordinate system transformation transforms $U_{tgt}$ and $V_{tgt}$ to azimuth and elevation angles in a non-rotating coordinate system.

14 Claims, 10 Drawing Sheets

METHOD OF GENERATING ACCURATE ESTIMATES OF AZIMUTH AND ELEVATION ANGLES OF A TARGET FOR A PHASED—PHASED ARRAY ROTATING RADAR

BACKGROUND OF THE INVENTION

1. Field of the Invention

This invention relates generally to a rotating phased-phased array radar, and in particular to a method of generating accurate estimates of azimuth and elevation angles of a radar target using pre-calculated monopulse curves for a rotating monopulse radar using coherent integration of pulse returns.

2. Description of Related Art

An antenna of a mechanically rotating radar moves in azimuth relative to a target as pulses are transmitted and received. As a result, the pulse returns are scan-modulated by the radar's two-way antenna patterns. In other words, the pulses experience dissimilar antenna pattern gains as the array rotates. Coherent integration of the pulse returns is done to increase the signal-to-noise ratios (SNRs) of the received signals prior to detection and target angle estimation. Non-rotating radars frequently employ the monopulse method for angle measurement. This process involves forming monopulse ratios and mapping those ratios to a target angle estimate using a pre-calculated monopulse curve or polynomial. The monopulse process has not been employed for rotating radars using coherent integration because the monopulse ratios do not map to the correct target angles when curves developed for a stationary array are used.

The performance of an angle estimation technique can be gauged by its beam-splitting ratio (BSR). The BSR is defined as the antenna pattern's two-way 3-dB beamwidth divided by the standard deviation of the angle error at 20 dB SNR. Previous rotating radars employing coherent integration, such as the U.S. Government's AN/SPS-49 Long-Range Air Surveillance Radar, have measured target azimuth angle using an algorithm to locate the centroid of the detected signal envelope. However, centroiding algorithms require multiple detections using mini-dwells and are characterized by small BSRs on the order of 2 to 4. The technique described herein is applicable for radars that want to coherently integrate the whole dwell for optimum performance and achieves BSRs on the order of 8 to 10 which is over twice the typical BSR of a centroiding U.S. Pat. No. 5,017,927, issued May 21, 1991 to Ashok K. Agrawal et al., and assigned to General Electric Co. of Morristown, N.J., discloses a technique for using phase shifters and variable gain amplifiers within the transmit-receive (TR) processor of each antenna element to compensate for errors in the internal circuitry of the sum, azimuth difference and elevation difference beam formers. This invention is designed for a non-rotating radar and is an improved hardware implementation of the original monopulse method. However, it does not correct for the effects of rotation on a radar employing coherent integration (CI).

U.S. Pat. No. 5,986,605, issued Nov. 16, 1999 to Leslie A. Priebe et al., and assigned to Raytheon Company of Lexington, Mass., discloses a new method of monopulse processing that only requires two receiver channels and does not form the traditional monopulse ratios. The antenna is still subdivided into four quadrants. Quadrant pairs are formed from the top two quadrants, the bottom two quadrants, the left quadrants and the right quadrants. The signals received on the quadrant pairs are multiplied together to form two correlation beams. The estimated elevation and azimuth angles are the phase angles of the correlation beams. Target detection is performed by thresholding the magnitude of either correlation beam. This patent disclosure is an entirely new method of monopulse processing that was designed for a non-rotating radar, and does not correct for the effects of rotation on a radar employing CI.

U.S. Pat. No. 6,618,008, issued Sep. 9, 2003, to John Arthur Scholz and assigned to Nederlandse Organisatie of Delft, Netherlands, discloses a variation on the traditional monopulse antenna architecture. The antenna is still subdivided into four quadrants and the signals received on these quadrants are still summed, differenced and divided to form monopulse ratios. However, the antenna quadrants in this invention are not fixed in place. Instead, the quadrants rotate so that the difference pattern nulls are either aligned or perpendicular to the returns from the target tracks. The inventors claim these "virtual" quadrants reduce the complication and expense of the RF hardware required and allows the target to be tracked along any angle instead of the traditional azimuth and elevation angles. This invention is designed for a non-rotating radar and is an architectural variation on the original monopulse method. However, it does not correct for the effects of rotation on a radar employing CI.

U.S. Pat. No. 6,680,687 issued Jan. 20, 2004 to Michel Phelipot and assigned to Thales of Paris, France discloses a variation on the traditional centroiding algorithm used by 2-dimensional (2D) rotating radars for estimating target azimuth. A transmitted N-pulse burst is split into two N/2-pulse half-bursts. These half-bursts are then processed to associate a signal amplitude and azimuth angle with each half-burst. Coherent integration is used to determine amplitude and centroiding is used to determine azimuth. The two half-burst measurements of amplitude and azimuth are then combined using a mathematical formula to generate an improved estimate of target azimuth. However, coherently integrating half-bursts result in a factor N/2 improvement in SNR. Coherently integrating the entire N pulse burst, as the present invention does, results in a factor N improvement in SNR. Thus, the present invention achieves 3dB more SNR. Furthermore, U.S. Pat. No. 6,680,687 is intended for a 2D radar. A 2D radar measures only range and azimuth as opposed to a 3D radar which measures range, azimuth and elevation. The present invention will work for either a 2D or 3D radar and takes into account any cross-coupling between the azimuth and elevation measurements.

SUMMARY OF THE INVENTION

Accordingly, it is therefore an object of this invention to provide a method for determining accurate estimates of a radar target azimuth angle and elevation angle for a rotating monopulse phased-phased array radar using coherent integration of target pulse returns.

It is another object of this invention to provide a method for generating scan modulated coherently integrated (SMCI) monopulse curves, and to use these curves to accurately calculate the radar target's sine-space offset from the beam steer. The target's sine-space position is then transformed to azimuth and elevation angles in a fixed non-rotating coordinate system.

These and other objects are further accomplished by a method for generating accurate estimates of a radar target's azimuth and elevation angles for a rotating monopulse radar comprising the steps of measuring an antenna's one-way transmit pattern and three receive antenna patterns, generating two-way Sum, Delta-Azimuth and Delta-Elevation antenna patterns, translating the coordinates of two-way Sum, Delta-Azimuth and Delta-Elevation antenna patterns to center on a sine-space beam steer, sampling uniformly the two-way antenna patterns at mid-CPI points of numerous target returns, coherently integrating over the sine-space trajectories of the target returns, averaging coherent integration sums of the target returns and plotting the averages at their respective mid-CPI points to produce average gain antenna patterns, generating U-offset and V-offset scan modulated coherently integrated (SMCI) monopulse curves from average gain patterns, coherently integrating the two-way Sum, Delta-Azimuth and Delta-Elevation target returns of the antenna patterns, calculating the target's monopulse ratios from the coherently integrated target return measurements, calculating the target's U-offset and V-offset monopulse angles in sine-space using the SMCI monopulse curves, adding the U-offset and V-offset monopulse angles to a sine-space beam steer to obtain an improved estimate of a target's sine-space position denoted as $U_{tgt}$ and $V_{tgt}$, and transforming the $U_{tgt}$ and $V_{tgt}$ to azimuth and elevation angles in a non-rotating coordinate system using coordinate system transformations and knowledge of the antenna's yaw and tilt angles. The method comprises the step of fitting polynomials to the SMCI monopulse curves using a method of least squares.

The objects are further accomplished by a method for applying SMCI monopulse polynomials to target returns and determining azimuth and elevation angles in a non-rotating coordinate system comprising the steps of coherently integrating the two-way Sum, Delta-Azimuth and Delta-Elevation antenna patterns target returns, calculating the target's U-offset and V-offset monopulse ratios from the coherently integrated target return measurements, calculating the target's U-offset and V-offset monopulse angles in sine-space using the SMCI monopulse polynomials, adding the U-offset and V-offset monopulse angles to a sine-space beam steer to obtain an improved estimate of a target's sine-space position denoted as $U_{tgt}$ and $V_{tgt}$, and transforming $U_{tgt}$ and $V_{tgt}$ to azimuth and elevation angles in a non-rotating coordinate system using knowledge of the antenna's yaw and tilt angles and coordinate system transformations. The step of transforming the estimates of a target's sine-space position $U_{tgt}$ and $V_{tgt}$ to azimuth and elevation angles in a non-rotating coordinate system comprises the steps of transforming the target's sine-space coordinates to normalized north-west-up (NWU) coordinates $(X_n, Y_n, Z_n)$, and calculating the target's NWU azimuth (Az_Tgt) and elevation (El_Tgt) using the following relationships $$Az\_Tgt = \arctan\left(\frac{Y_n}{X_n}\right); \text{ and}$$

$$El\_Tgt = \arctan\left(\frac{Z_n}{\sqrt{X_n^2 + Y_n^2}}\right).$$

The objects are further accomplished by a method of producing an average gain pattern for a rotating radar employing coherent integration comprising the steps of storing a measured two-way antenna pattern with U and V sine-space coordinates, translating the antenna coordinates to center on a beam steer, calculating a W component of the antenna pattern coordinates, calculating the number of samples in a coherent processing interval (CPI), calculating a yaw angle scanned in a sampling period, calculating the yaw angle scanned in the CPI, calculating a starting yaw angle with respect to the NWU X-axis, calculating mid-CPI points of numerous target returns in a NWU frame, coherently integrating over trajectories of the target returns for integration steps one to number of samples in a CPI, and averaging the coherently integrated pattern of the target returns to obtain an average gain pattern. Coherently integrating over the trajectories of the target returns comprises the steps of determining the antenna yaw angle at each integration step, calculating sine-space trajectories of the target returns, interpolating the two-way antenna patterns at the trajectory points, and coherently integrating by summing the antenna pattern gains at each point in the sine-space trajectories of the target returns and plotting the sums at the mid-CPI points of their respective sine-space trajectories, and averaging the coherently integrated antenna patterns by dividing the antenna pattern gains by the number of samples in a CPI to produce an average gain two-way antenna pattern.

The objects are further accomplished by a phased-phased array rotating radar system comprising a phased-phased array rotating antenna, an antenna electronics unit for sending and receiving signals to and from the phased-phased array rotating antenna wherein the direction of radar beams transmitted by the antenna are electronically controlled, means connected to the antenna electronics unit for processing target return signals and generating transmit command signals, a signal and data processor for generating estimates of a target azimuth angle and elevation angle including means for pulse compression of target return signals, means for coherent integration of compressed pulses, means for detection processing of the coherently integrated compressed pulses, means for monopulse processing of detected signals, means for target tracking, means for generating array beam steering commands, a beam steering generator connected to the signal and data processor for generating beam steering commands for the antenna electronics unit, the signal and data processor for generating estimates of a target azimuth angle and elevation angle comprises means for generating scan modulated monopulse curves from average gain patterns, means for calculating a target's monopulse ratios, means for calculating the target's U-offset and V-offset monopulse angles, means for adding the U-offset and the V-offset monopulse angles to a sine-space beam steer obtaining estimates of the target's angular position ($U_{tgt}$ and $V_{tgt}$), and means for transforming the estimates $U_{tgt}$ and $V_{tgt}$ to the azimuth and elevation angles in a non-rotating coordinate system.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
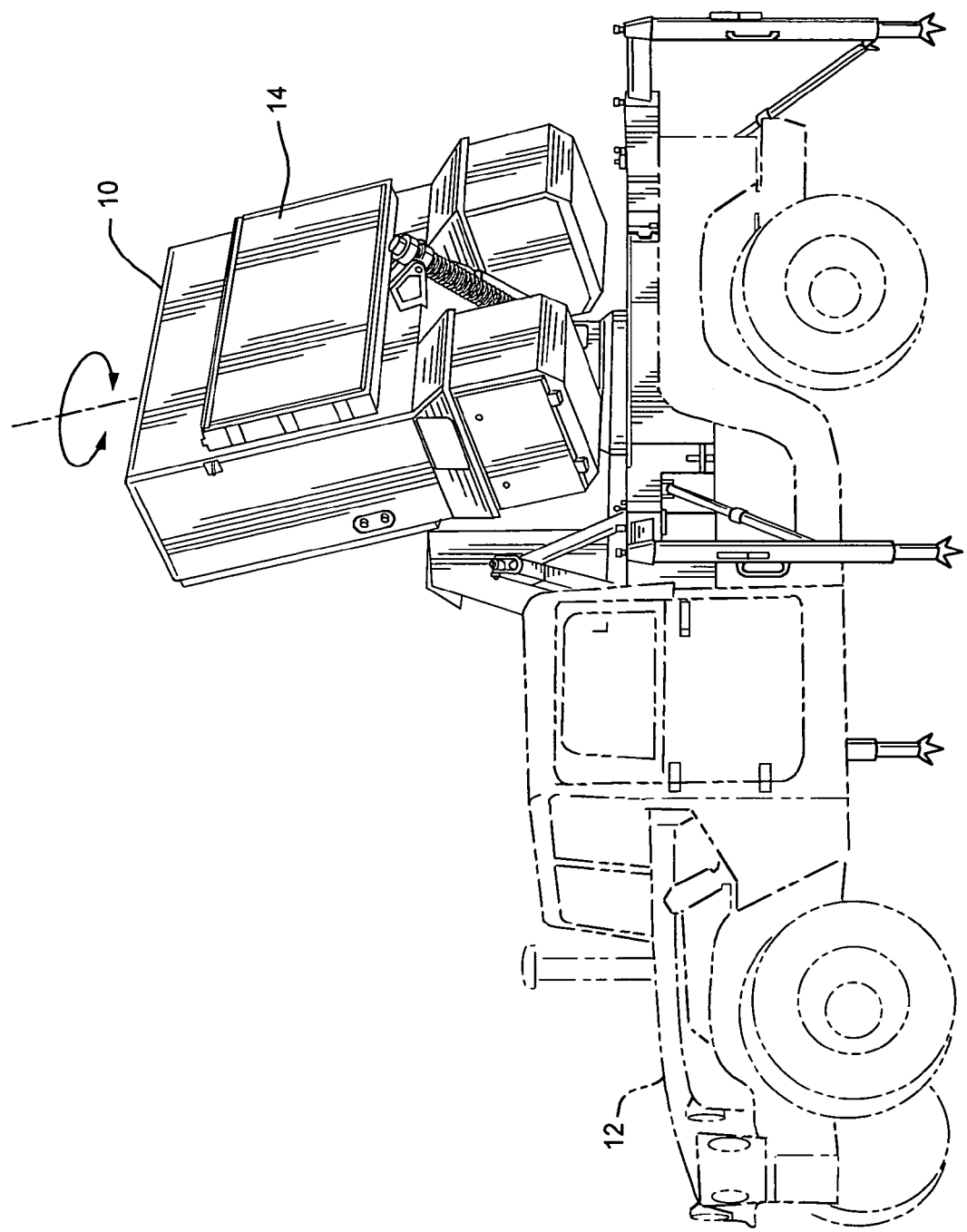
FIG. 1 is an illustration of a motor vehicle having a rotating phased-phased array radar mounted on it which employs a method of generating accurate estimates of a target azimuth angle and elevation angle according to the present invention.

Referring to FIG. 1, a rotating phased-phased array radar system 10 mounted on the back of a truck-type vehicle 12 is shown, and the radar system 10 employs a method of generating accurate estimates of a target's azimuth and elevation angles according to the present invention.

An antenna 14 of the phased-phased array rotating radar system 10 moves in azimuth relative to a target as pulses are transmitted and received. As a result, the target returns are scan-modulated by the radar's two-way antenna patterns as the antenna 14 rotates through a dwell, the dwell being the interval of time during which pulses are transmitted and received. Not all of the pulses transmitted are coherently integrated. A small number of the initial pulses are used to fill and settle the signal processing filters. These pulses are called fill pulses. Pulses received after the fill pulses are coherently integrated. The portion of the dwell during which the pulses to be coherently integrated are transmitted and received is called the coherent processing interval or CPI. Scan modulation causes the target return pulses to experience dissimilar sum and difference pattern gains as the antenna 14 moves relative to the target. Coherent integration of the pulse returns increases the signal-to-noise ratios of the sum and difference channel signals prior to detection and target angle refinement. The rotating radar system 10 employs a method of generating monopulse curves for the rotating phased-phased array radar system 10 and also employs coherent integration. The monopulse measurements are combined with array position and rotation rate information to generate estimates of the target's azimuth and elevation angles.

Figure 2:
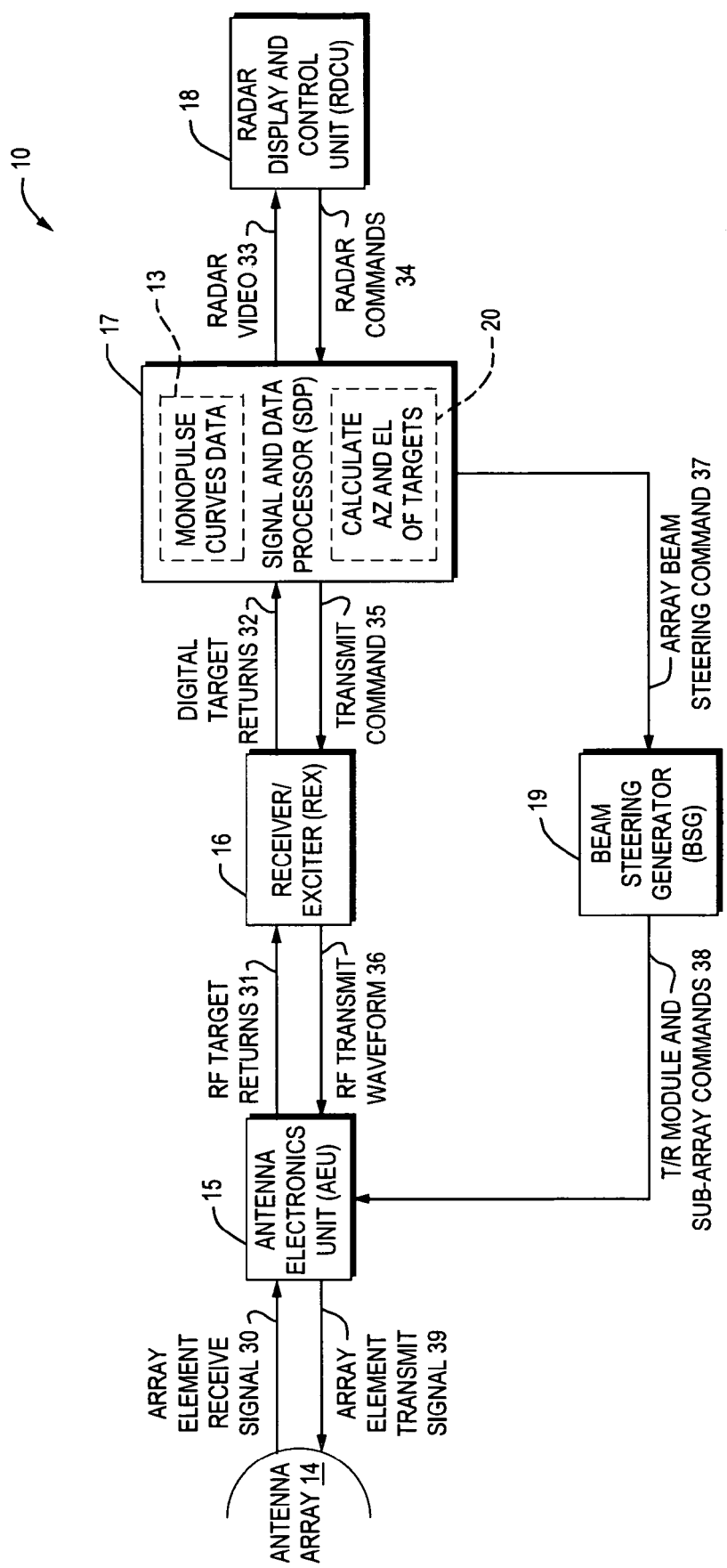
FIG. 2 is a functional block diagram of the rotating phased-phased array radar system of FIG. 1 according to the present invention.

Referring to FIG. 2, a block diagram is shown of the rotating phased-phased array radar system 10 of FIG. 1. The radar system comprises a phased-phased array antenna 14, an antenna electronics unit (AEU) 15, a receiver/exciter (REX) 16, a signal and data processor (SDP) 17, a radar display and control unit (RDCU) 18 and a beam steering generator (BSG) 19.

The phased-phased array antenna 14 receives and transmits RF signals 30, 39 into and from space, respectively. The phased-phased array antenna 14 comprises many individual array elements with a transmit/receive (T/R) module (not shown) connected to each array element. These array elements are combined into transmit/receive integrated microwave modules (TRIMMs). The TRIMMs are combined to form sub-arrays. The sub-arrays are combined to form the array antenna 14. The direction of the transmit and receive radar beams is electronically controlled by changing the phase shifts, attenuation and polarization settings (if applicable) of the T/R modules and the time-delays of the individual sub-arrays. The AEU 15 comprises the T/R modules, the TRIMMs, the sub-arrays and their interconnections, as well as the interfaces to the REX 16 and the BSG 19. The AEU 15 sends RF target returns 31 to the REX 16 and receives RF transmit waveform signals 36 from the REX 16. The REX 16 comprises an exciter portion which generates the RF transmit waveform signals 36 and sends them to the AEU 15, and a receiver portion which receives RF monopulse signals from the AEU 15, digitizes said RF monopulse signals, and provides them to the SDP 17.

The SDP 17 comprises a signal processing portion which performs pulse compression, coherent integration, detection processing, monopulse processing, clutter suppression and RF interference cancellation. A data processing portion of the SDP 17 provides automatic target tracking which includes the selection of the beam position and waveform for the next target update. The SDP 17 sends radar video 33 to the RDCU 18. The BSG 19 receives array beam steering commands 37 from the SDP 17 and provides time delay commands to the sub-arrays, and phase shift, attenuation and polarization commands to the T/R modules in the AUE 15 in order to position the radar beam. The RDCU 18 provides radar video signals 33 regarding target location in polar coordinates (range and azimuth) using a PPI (plan position indicator) display. This RDCU 18 also allows a radar operator or external control unit to issue radar commands 34 to change various parameters and functions of the radar system 10 in order to optimize performance in accordance with environmental conditions. The radar system 10 features that may be controlled include RF frequency, types of signal processing, transmitted waveform, clutter suppression, and RF interference cancellation.

Figure 3:
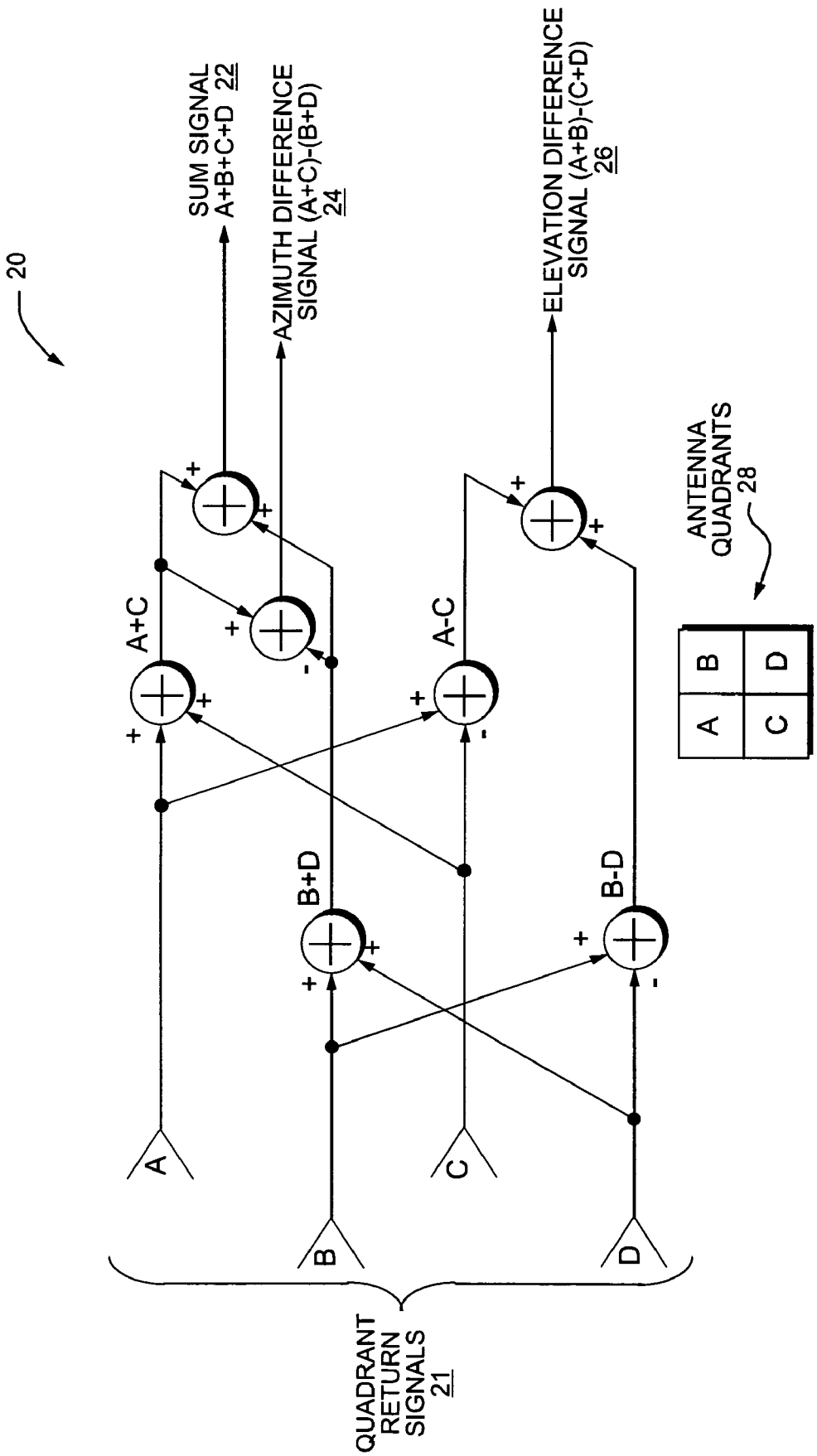
FIG. 3 is a block diagram of a four feed monopulse network showing the generation of a sum signal, an azimuth difference signal and an elevation difference signal.

Referring to FIG. 3, a block diagram of a four feed monopulse network 20 is shown. Mechanical dish antennas typically use horn antennas for feeds while phased-phased array antennas 14 use sub-arrays. Each feed antenna is placed within a quadrant 28 of the antenna and produces its own radiation pattern that is displaced from the antenna boresight axis. When a signal arrives on the boresight axis each feed antenna receives an equal amount of energy. However, when the target is off boresight an imbalance of energy occurs in the different feeds. This imbalance of energy generates error signals that are used to estimate the signal's angular position. The process used to estimate the signal's angular position is called the monopulse process.

The term monopulse refers to the fact that the required information is obtained from a single pulse. However, this single pulse may be obtained by coherently integrating a burst of pulses. Amplitude-comparison monopulse requires the measurement of a sum signal 22, an azimuth difference signal 24, and an elevation difference signal 26 as shown in FIG. 3. Two ratios called monopulse ratios are formed by dividing the azimuth difference 24 and elevation difference 26 signals by the sum signal 22. The monopulse ratios are then mapped to the signal's angular offset from boresight using monopulse curves or polynomials.

Figure 9:
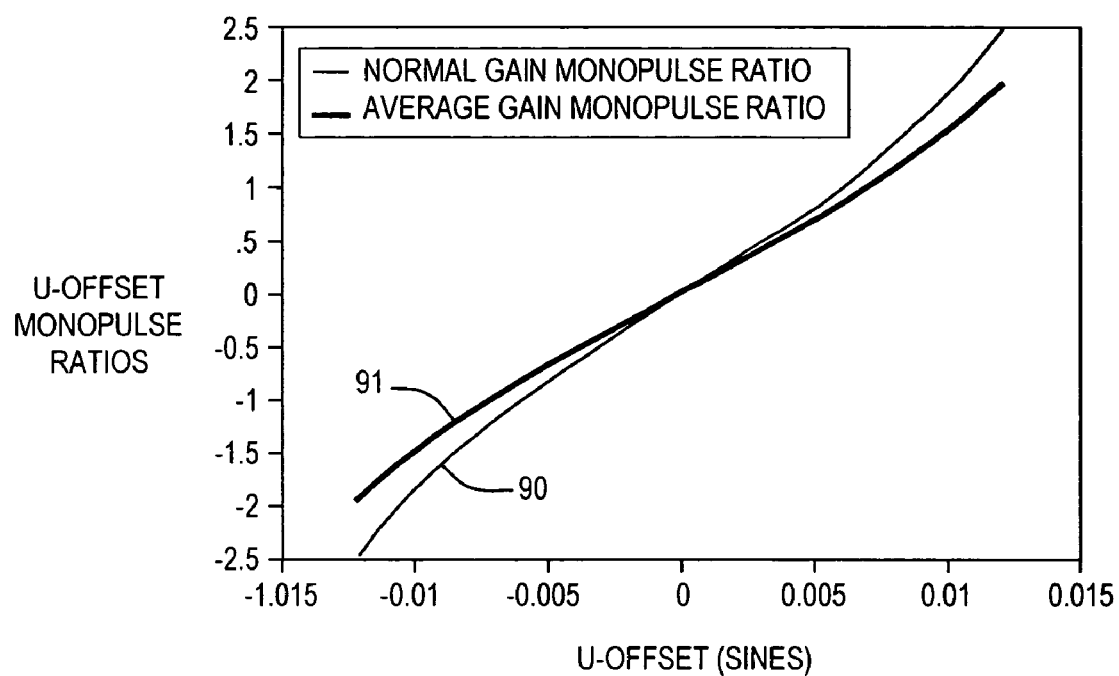
FIG. 9 is a graph showing U-offset monopulse curves when the sine-space beam steer is $U_{beam}=0$ and $V_{beam}=-0.3$.
Figure 10:
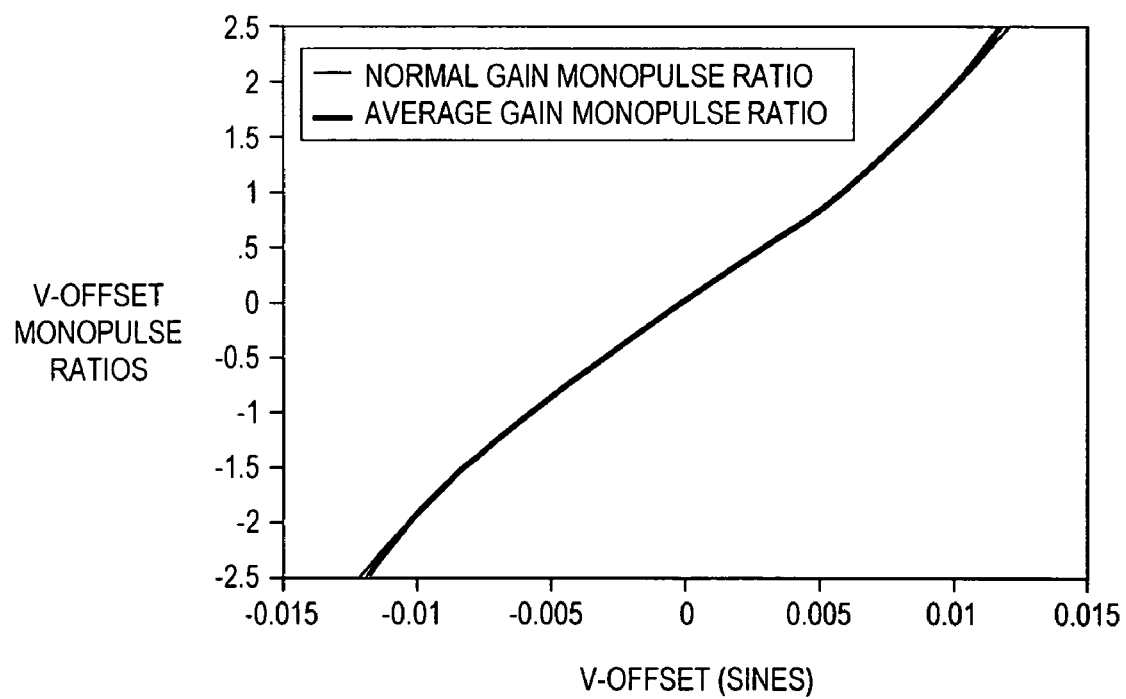
FIG. 10 is a graph showing V-offset monopulse curves when the sine-space beam steer is $U_{beam}=0$ and $V_{beam}=-0.3$.
Figure 11:
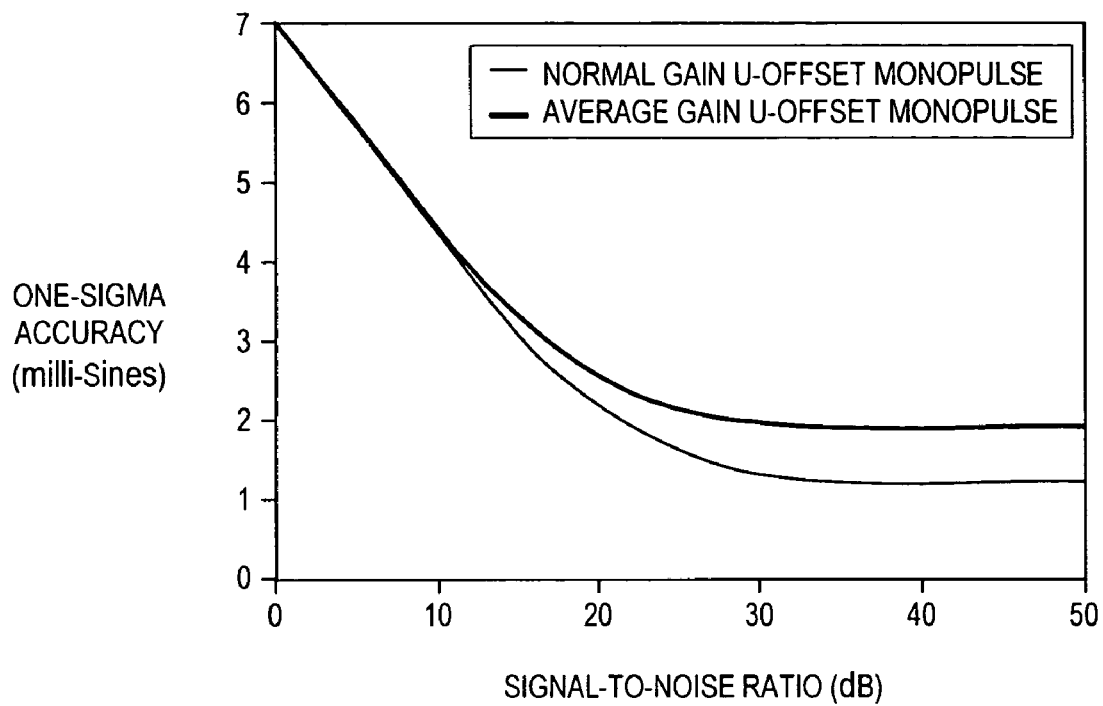
FIG. 11 is a graph showing the one-sigma accuracy performance of the U-offset monopulse curves of FIG. 9.

Monopulse angle refinement follows target detection, and begins by forming the real parts of the complex ratios of the pulse compressed sum and difference channel target returns. These quantities are called monopulse ratios and are mathematically defined as:

$$r_U = \text{real}\left\{\frac{\Delta_{AZ}}{\Sigma}\cos(\varphi_{AZ})\right\}$$

$$r_V = \text{real}\left\{\frac{\Delta_{EL}}{\Sigma}\cos(\phi_{EL})\right\}$$

where
$r_U$=the U-offset monopulse ratio
$r_V$=the V-offset monopulse ratio
$\Delta_{AZ}$=pulse compressed azimuth difference signal
$\Delta_{EL}$=pulse compressed elevation difference signal
$\Sigma$=pulse compressed sum signal
$\phi_{AZ}$=phase angle between the sum and azimuth difference channels
$\phi_{EL}$=phase angle between the sum and elevation difference channels Usually $\phi_{AZ}$ and $\phi_{EL}$ are zero or 180 degrees, and $r_U$ and $r_V$ are frequently called the azimuth and elevation difference channel monopulse ratios, respectively. The $r_U$, $r_V$ monopulse ratios are mapped to offset angles in sine-space using pre-calculated curves or polynomials. The offsets are added to the beam steer to produced refined target angle estimates. This refinement is expressed mathematically as:

$$U_{tgt}=U_{beam}+U_{offset}$$

$$V_{tgt}=V_{beam}+V_{offset}$$

where $U_{tgt}$, $V_{tgt}$ are the refined target angle estimates in sine-space, $U_{beam}$, $V_{beam}$ are the beam steer coordinates in sine-space, and $U_{offset}$, $V_{offset}$ are the U, V offset angles obtained from the monopulse curves or polynomials. FIGS. 9-10 are graphs showing U-offset and V-offset monopulse curves, and they are described hereinafter.

Coherently integrating the pulse returns is frequently done to increase the signal-to-noise ratios of the sum and difference channel signals prior to target detection and angle refinement. For non-rotating radars this has no impact on the monopulse process as the individual pulse returns experience the same sum and difference pattern gains. However, target returns received by a rotating radar are scan-modulated by the antenna's two-way patterns as the radar rotates through the dwell. In other words, the pulses experience different sum and difference pattern gains as the antenna face moves relative to the target. Consequently, the mean gains of the coherently integrated pulses are the coherent average of the antenna pattern gains that cut across the target, and the monopulse ratios are ratios of average not point gains. For the monopulse process to work accurately, the monopulse curves should be calculated from average gain far-field patterns. Antenna patterns should be coherently averaged over the radar's coherent processing interval (CPI) and should take into account rotation rate, antenna tilt, beam steer and CPI length. The process for calculating the average gain far-field patterns of a rotating radar are described herein.

The coordinate systems used in this description are the North-West-Up (NWU) coordinate system, the Radar Face Coordinate (RFC) system, and the NWU or Sine-Space Coordinate system.

The NWU system is a right-handed Cartesian coordinate system with its origin located at the intersection of the antenna's axis of rotation and its boresight vector. The boresight vector is the antenna face normal originating at the face center. The NWU positive Z-axis points up and is defined as being perpendicular to the reference ellipsoid and defines the local level plane. The positive X-axis points north and is defined as the projection of the Earth rotation angular rate vector onto the local level plane. The positive Y-axis points west and completes the right-handed orthogonal set.

The RFC system is a right-handed Cartesian coordinate system with its origin located at the antenna face center. The RFC positive Y-axis is oriented vertical and points upward, parallel to the antenna face. The positive Z-axis is pointed outward and normal to the antenna face. The positive X-axis is defined to complete the right-handed coordinate system.

The UVW coordinate system is a straightforward extension of the RFC system. A coordinate point expressed in the RFC system is converted to the UVW (sine-space) system by normalizing the range to 1. For example, if $(X_{RFC}, Y_{RFC}, Z_{RFC})$ is a RFC coordinate, the corresponding UVW coordinate is $$u=x_{RFC}/\text{Range}$$

$$v=y_{RFC}/\text{Range}$$

$$w=z_{RFC}/\text{Range}$$

where $\text{Range}=\sqrt{x_{RFC}^2+y_{RFC}^2+z_{RFC}^2}$.

Since range is always unity in the UVW system, only two coordinates are necessary to communicate the underlying information. The third coordinate can be determined by solving the equation $$\sqrt{u^2+v^2+w^2}=1.$$

Typically, only the UV coordinates of the UVW system are used. Beam steers and antenna patterns are expressed in coordinates because with the exception of scan loss, antenna patterns expressed in UV coordinates are invariant with respect to the beam steer. Although sine-space coordinates are unit-less, they are often expressed with the unit of "sine" to identify what they are.

Figure 4:
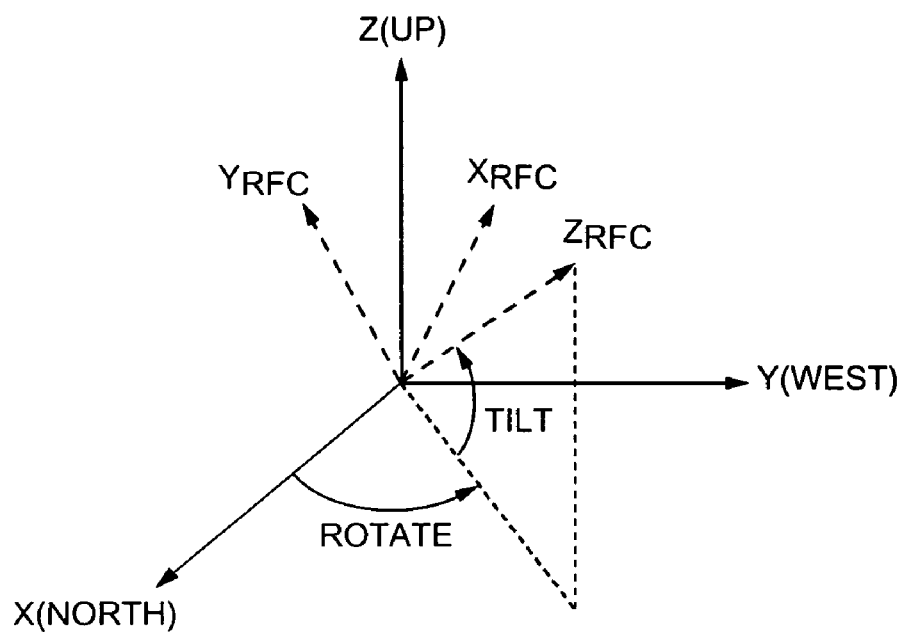
FIG. 4 is an illustration of North-West-Up (NWU) and Radar Face Coordinate (RFC) systems.

Referring to FIG. 4, the NWU and RFC coordinate systems are illustrated. The rotation angle of the antenna face is denoted Rotate and taken with respect to true North. The Rotate angle is also called the Yaw angle. The tilt angle of the antenna face is denoted Tilt and is taken with respect to the XY plane.

Strictly speaking, the NWU and RFC systems do not share the same origin. The antenna face center of a rotating radar is typically about half a meter from the antenna's axis of rotation and the NWU origin. However, for the purpose of calculating average gain far-field patterns we shall assume that the NWU and RFC systems share the same origin. Since the range of a radar target is characteristically anywhere from a few kilometers to hundreds of kilometers, this small approximation should not be a problem.

The coordinate system transformation from the NWU to RFC frame is presented below. In the transformation, $(x_{NWU}, y_{NWU}, z_{NWU})$ denotes a point in the NWU frame, and $(x_{RFC}, y_{RFC}, z_{RFC})$ denotes a point in the RFC frame. The two frames are assumed to share the same origin. To transform from the NWU frame to the UVW frame, simply normalize the point's range to unity either before or after the transformation.

$$\begin{bmatrix} x_{RFC} \\ y_{RFC} \\ z_{RFC} \end{bmatrix} = \begin{bmatrix} -\sin(\text{Rotate}) & \cos(\text{Rotate}) & 0 \\ -\cos(\text{Rotate})\sin(\text{Tilt}) & -\sin(\text{Rotate})\sin(\text{Tilt}) & \cos(\text{Tilt}) \\ \cos(\text{Rotate})\cos(\text{Tilt}) & \sin(\text{Rotate})\cos(\text{Tilt}) & \sin(\text{Tilt}) \end{bmatrix} \begin{bmatrix} x_{NWU} \\ y_{NWU} \\ z_{NWU} \end{bmatrix}$$

The RFC to NWU coordinate system transformation is shown below. To transform from the UVW frame to the NWU frame, simply multiply the sine-space point by the target's range either before or after the transformation.

$$\begin{bmatrix} x_{NWU} \\ y_{NWU} \\ z_{NWU} \end{bmatrix} = \begin{bmatrix} -\sin(\text{Rotate}) & -\cos(\text{Rotate})\sin(\text{Tilt}) & \cos(\text{Rotate})\cos(\text{Tilt}) \\ \cos(\text{Rotate}) & -\sin(\text{Rotate})\sin(\text{Tilt}) & \sin(\text{Rotate})\cos(\text{Tilt}) \\ 0 & \cos(\text{Tilt}) & \sin(\text{Tilt}) \end{bmatrix} \begin{bmatrix} x_{RFC} \\ y_{RFC} \\ z_{RFC} \end{bmatrix}$$

Figure 5:
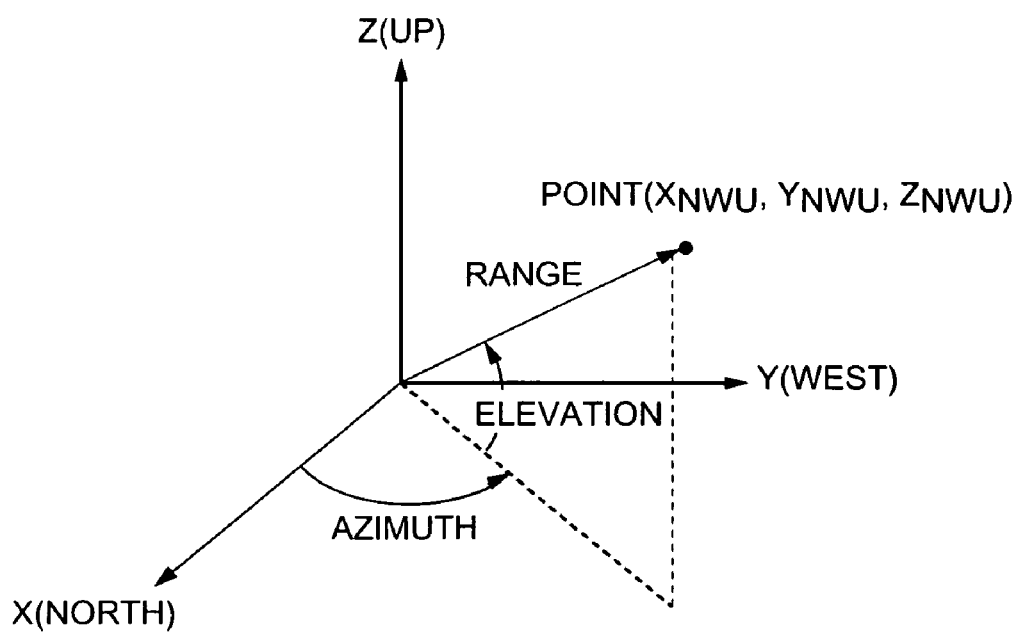
FIG. 5 is an illustration of range, azimuth and elevation (RAE) in the North-West-Up (NWU) coordinate system.

Referring to FIG. 5, a point in the NWU frame is illustrated which can also be expressed in terms of Range, Azimuth and Elevation or RAE coordinates. Range (R) is the shortest distance from the origin to the point. Azimuth (AZ) is the angle from the X-axis to the projection of the Range vector onto the XY plane. Elevation (El) is the smallest angle between the Range vector and the XY plane. Mathematical relationships between RAE and Cartesian coordinates are given below.

Figure 6:
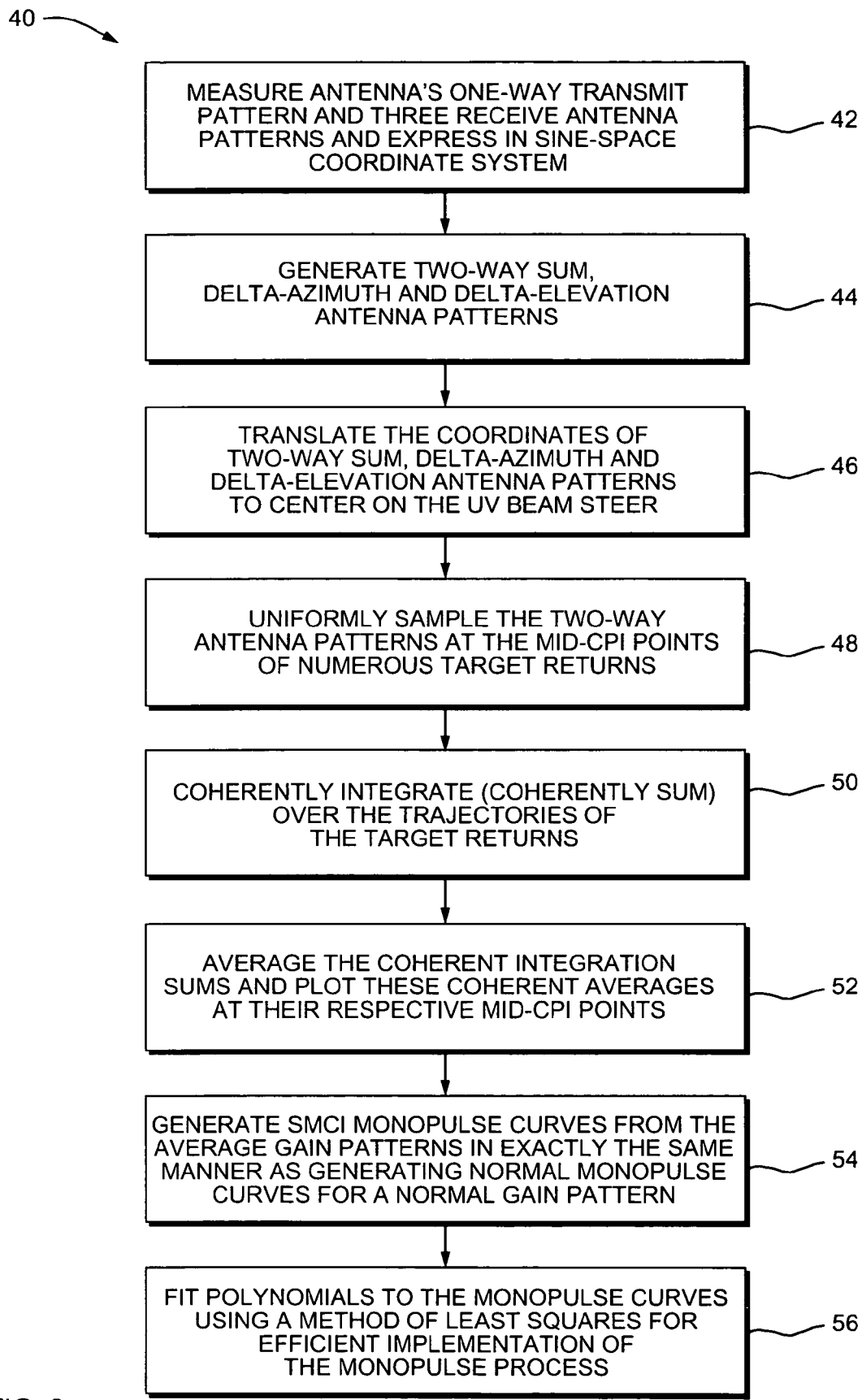
FIG. 6 is a block diagram of the steps of the Method for generating scan modulated coherently integrated (SMCI) monopulse curves according to the present invention.

$\text{Range} = \sqrt{x_{NWU}^2 + y_{NWU}^2 + z_{NWU}^2}$ $\text{Azimuth} = \arctan(y_{NWU}/x_{NWU})$ $\text{Elevation} = \arctan(z_{NWU}/\sqrt{x_{NWU}^2 + y_{NWU}^2})$ Referring to FIG. 6, a block diagram illustrates the steps of the method 40 for generating scan-modulated coherently integrated (SMCI) monopulse curves according to the invention. The method comprises in step 42 measuring the antenna's one-way transmit pattern and three receive antenna patterns and expressing them in the sine-space coordinate system. The three receive patterns are the one-way Sum, Delta-Azimuth and Delta-Elevation patterns. Step 44 comprises generating the two-way Sum, Delta-Azimuth and Delta-Elevation antenna patterns by multiplying point-by-point the one-way transmit pattern with the one-way Sum, Delta-Azimuth and Delta-Elevation patterns. The method in step 46, translates the coordinates of the two-way Sum, Delta-Azimuth and Delta-Elevation antenna patterns to center on the sine-space beam position.

Figure 8:
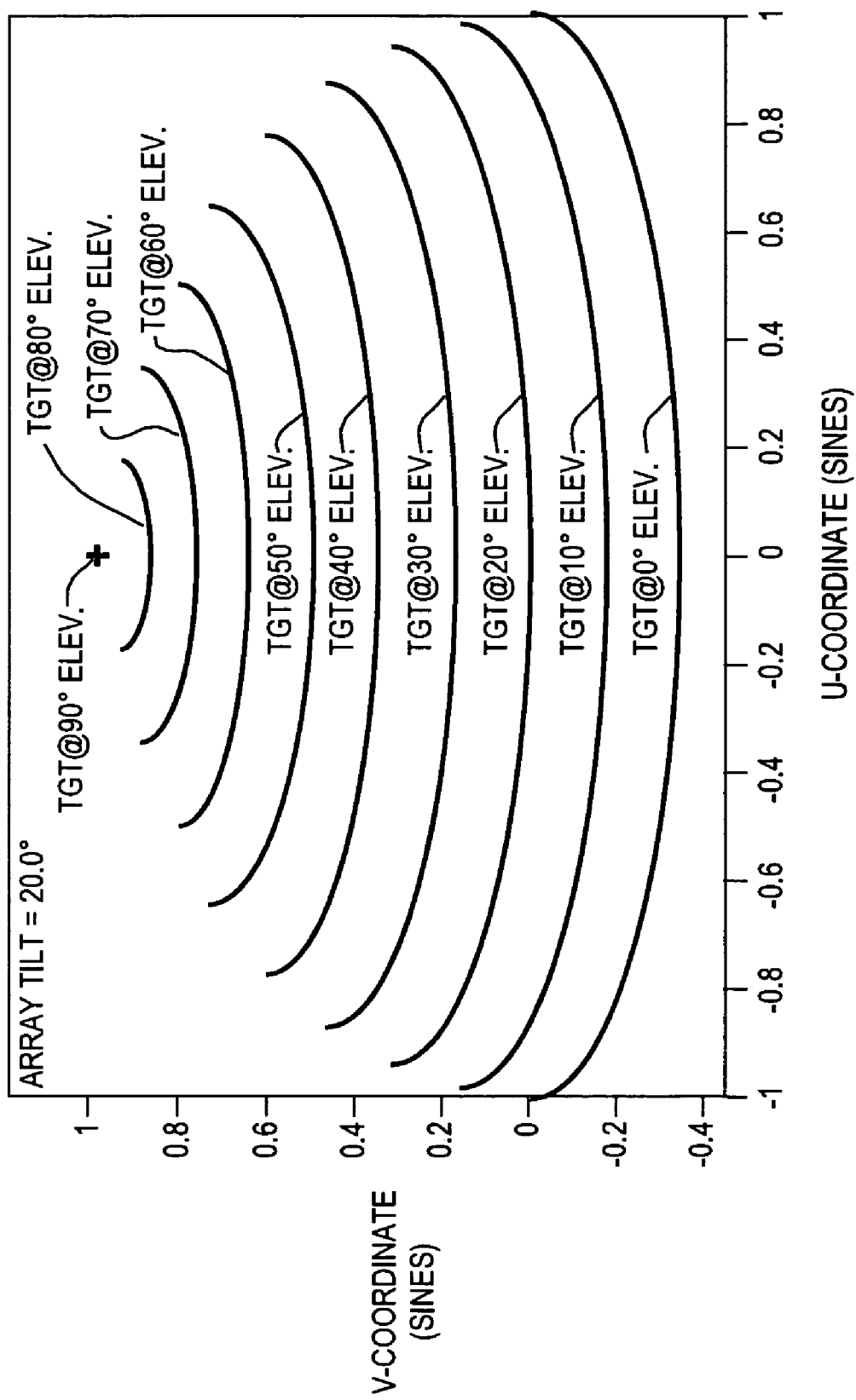
FIG. 8 is a graph of UV trajectories for target returns of a rotating radar having an antenna tilt of 20 degrees.

Referring to FIG. 8, target return trajectories are shown for a rotating radar having a tilt angle of 20 degrees. As the antenna rotates, the target returns traverse the antenna patterns along dissimilar paths of different lengths depending on target position, antenna tilt, beam steer, rotation rate and dwell length. In FIG. 8 the radar targets are located at 0, 10, 20, . . . , 90 degrees elevation in the NWU frame.

Referring again to FIG. 6, the method in step 48 comprises uniformly spaced samples of the two-way antenna patterns. The UV coordinates of the sample points are taken as the mid-CPI (Coherent Processing Interval) points of the numerous possible target returns. In step 50, coherently integrating (coherently summing) over the trajectories of the target returns. A small sampling period is used to get a large sample set of the antenna gains that lie along the target return trajectories. The mathematics of the summing processing is described in the "For Loop" of Table 3.

The method includes in step 52 averaging the coherent integration sums, and plotting these coherent averages at their respective mid-CPI points. At this point the average gain two-way Sum, Delta-Azimuth and Delta-Elevation antenna patterns have been generated for the given beam steer. In step 54, generate the SMCI monopulse curves from the average gain pattern in exactly the same manner as generating normal monopulse curves from a normal gain pattern. U-offset monopulse curves are calculated by dividing the Delta-Azimuth U-cardinal plane gains by the Sum U-cardinal plane gains. V-offset monopulse curves are calculated by dividing the Delta-Elevation V-cardinal plane gains by the Sum V-cardinal plane gains. In step 56, polynomials are fitted to the monopulse curves using the method of least squares for efficient implementation of the monopulse process.

Application of the SMCI monopulse process results in an estimate of the target's angular position in sine-space. However, sine-space is centered on the antenna face and therefore rotates with the antenna. The ultimate goal of the process is to express the target's angular position in a non-rotating coordinating system. The non-rotating coordinate system used herein is the North-West-Up (NWU) coordinate system; however, any non-rotating coordinate system may be used. The steps for implementing the SMCI monopulse process are described below. The radar's Signal Data Processor (SDP) unit 17 performs the implementation and all coordinate system transformations.

Figure 7:
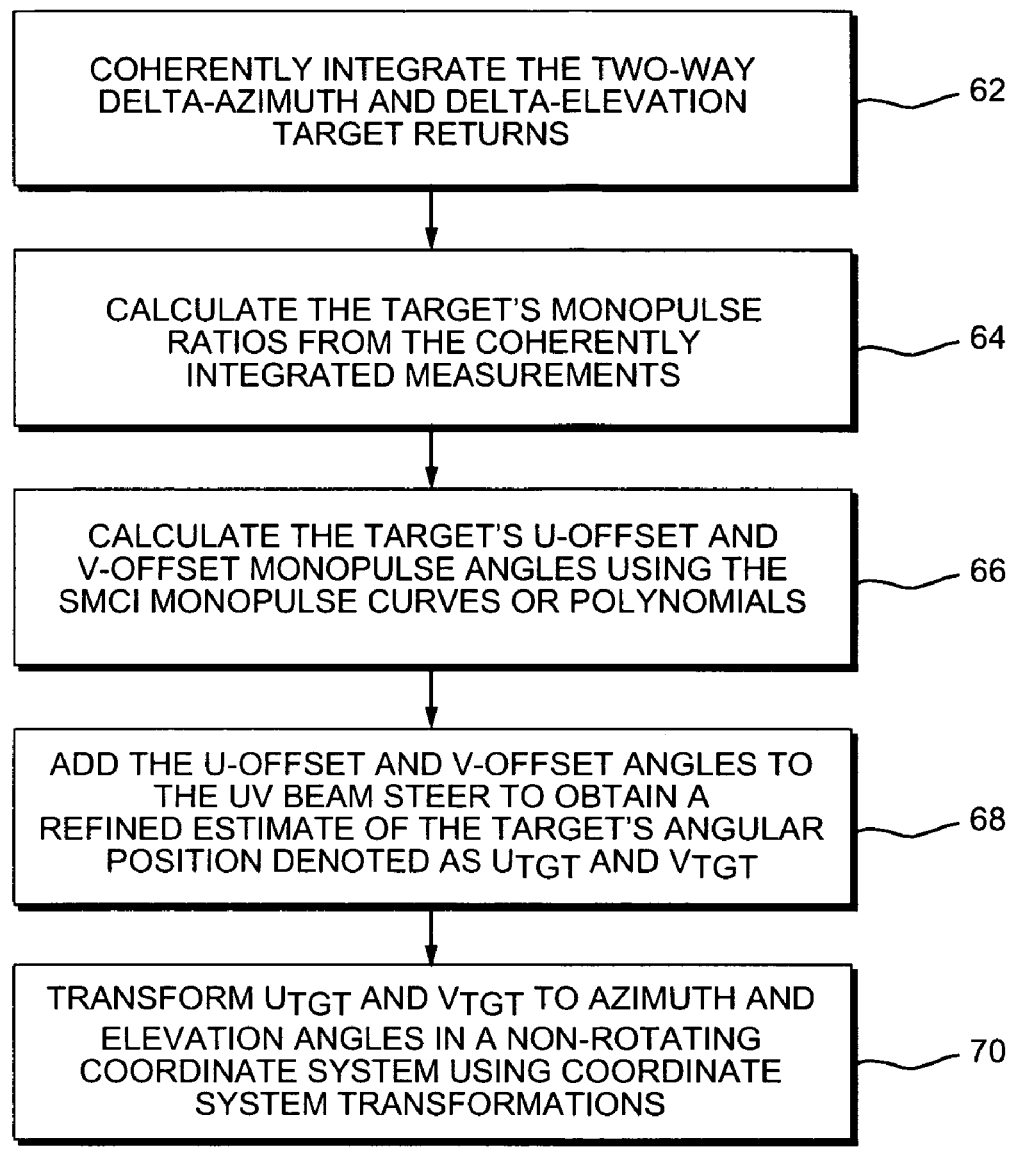
FIG. 7 is a block diagram of the steps of the method for applying the SMCI monopulse curves to target returns and determining azimuth and elevation angles in a non-rotating coordinate system according to the present invention.

The SMCI monopulse curves are a function of the radar's beam steer and must be calculated in advance for the expected beam positions. Referring now to FIG. 7, a block diagram 60 illustrates the steps of a method for applying the SMCI monopulse curves to target returns and determining azimuth and elevation angles in a non-rotating coordinate system according to the present invention. The method comprises in step 62, coherently integrating the two-way Sum, Delta-Azimuth and Delta-Elevation target returns. In step 64, calculating the target's monopulse ratios from the coherently integrated pulses, and in step 66, using the SMCI monopulse curves or polynomials to calculate the target's U-offset and V-offset monopulse angles. In step 68, adding the U-offset and V-offset angles to the sine space beam steer to obtain a refined estimate of the target's angular position denoted as $U_{tgt}$ and $V_{tgt}$. In step 70, using coordinate system transformations to transform $U_{tgt}$ and $V_{tgt}$ to azimuth and elevation angles in a non-rotating coordinate system. To perform this transformation requires knowledge of the antenna's tilt angle and-rotation angle at mid-CPI. The antenna's rotation angle is measured using a rotary position sensor known as a resolver transducer.

A pseudo-code description of the algorithm for coherently averaging the antenna patterns is provided in Tables 1, 2 and 3. Table 1 defines the required inputs, Table 2 defines the required functions, and Table 3 lists the steps of the algorithm. Statements beginning with a percentage sign (%) are descriptive comments and are not executed. Statements that do not start with a percentage sign are mathematical operations that are executed. The notation used is similar to that used by the MATLAB programming language and should be familiar to one of ordinary skill in the art.

TABLE 1

REQUIRED INPUTS

% U_Beam: The sine-space U component of the beam steer
% (sines).
% V_Beam: The sine-space V component of the beam steer
% (sines).
% U_Pat: A vector containing the U coordinates of the
% antenna patterns (sines).
% V_Pat: A vector containing the V coordinates of the
% antenna patterns (sines).
% Sum: The two-way sum pattern defined at points
% U_Pat x V_Pat*.
% DeltaAz: The two-way delta azimuth pattern defined at
% points U_Pat x V_Pat*.
% DeltaEl: The two-way delta elevation pattern defined at
% points U_Pat x V_Pat*.
% CPI: The length of the Coherent Processing Interval in
% seconds.
% Ts: Sampling Period in seconds.
% Tilt: The antenna tilt angle in degrees.
% Scan_Rate: Antenna rotation rate in revolutions per minute
% (RPM).
% RotateMidCPI: The antenna's mid-CPI yaw angle with respect
% to (wrt) the NWU X-axis in degrees.
% *Note: U_Pat x V_Pat denotes the set of all ordered pairs
% (u, v) such that u and v are taken from U_Pat and V_Pat,
% respectively.

TABLE 2

REQUIRED FUNCTIONS

% Round off X to the nearest integer Y.
    Y = round(X)
% Calculate the W component of sine-space points U x V.
    [W] = uv_to_uvw(U, V)
% Transform the RFC coordinates U,V,W to NWU coordinates
% X,Y,Z for a given antenna Tilt and Rotate angle.
    [X, Y, Z] = RFC_to_NWU(U, V, W, Tilt, Rotate)
% Transform the NWU coordinates X,Y,Z to RFC coordinates
% U,V,W for a given antenna Tilt and Rotate angle.
    [U, V, W] = NWU_to_RFC(X, Y, Z, Tilt, Rotate)
% Interpolate at points A x B over a two-dimensional
% antenna PATTERN defined at points U x V. The
% interpolated values are stored in two-dimensional array
% INTPL.
    INTPL = interpolate(U, V, PATTERN, A, B)

TABLE 3

ALGORITHM

% Translate the antenna pattern coordinates to center on
% the beam steer.
    U_Ant = U_Pat + U_Beam
    V_Ant = V_Pat + V_Beam
% Calculate the W component of the antenna pattern
% coordinates.
    [W_Ant] = uv_to_uvw(U_Ant, V_Ant)
% Calculate the number of samples in a CPI.
    Num_Samples = round(CPI/Ts)

TABLE 3-continued

ALGORITHM

% Calculate the yaw angle scanned in a sampling period.
    Rotate_Ts = Scan_Rate*(2*pi/60)*Ts
% Calculate the yaw angle scanned in a CPI.
    Rotate_CPI = Num_Samples*Rotate_Ts
% Calculate the starting yaw angle wrt NWU X-axis.
    Start_Rotate = −Rotate_CPI/2 + .5*Rotate_Ts
% Calculate the mid-CPI points in the NWU frame.
    RotateMidCPI = 0.0
    [xr, yr, zr] = RFC_to_NWU(U_Ant, V_Ant, W_Ant, Tilt,
    RotateMidCPI)
% Coherently integrate over the trajectories of the target
% returns. Initialize the matrices SumAvg, DeltaAzAvg and
% DeltaElAvg to zero matrices.
    For i = 1 : Num_Samples
        % Calculate the antenna yaw angle.
        Rotate = Start_Rotate + (i−1)*Rotate_Ts
        % Calculate the target return trajectories.
        [Ur, Vr, Wr] = NWU_to_RFC(xr, yr, zr, Tilt, Rotate)
        % Interpolate at the trajectory points.
        Sum2 = interpolate(U_Ant, V_Ant, Sum, Ur, Vr)
        DeltaAz2 = interpolate(U_Ant, V_Ant, DeltaAz, Ur, Vr)
        DeltaEl2 = interpolate(U_Ant, V_Ant, DeltaEl, Ur, Vr)
        % Coherently integrate the patterns.
        SumAvg = SumAvg + Sum2
        DeltaAzAvg = DeltaAzAvg + DeltaAz2
        DeltaElAvg = DeltaElAvg + DeltaEl2
    End
% Average the coherently integrated patterns to obtain
% average gain patterns.
    SumAvg = SumAvg / Num_Samples
    DeltaAzAvg = DeltaAzAvg / Num_Samples
    DeltaElAvg = DeltaElAvg / Num_Samples U-offset monopulse curves for the normal and average gain patterns are calculated by taking the real part of the Delta-Azimuth U-cardinal plane gains divided by the Sum U-cardinal plane gains. V-offset monopulse curves are calculated by taking the real part of the Delta-Elevation V-cardinal plane gains divided by the Sum V-cardinal plane gains. The curves are calculated over the 6-dB beamwidth of the one-way Sum pattern. Mathematically, the monopulse curves can be expressed as:

$$F_U(U_{offset}) = \text{real}\left(\frac{\Delta Az(U_{offset})}{\text{Sum}(U_{offset})}\cos(\varphi_{AZ})\right) = \text{U-offset monopulse curve}$$

$$F_V(V_{offset}) = \text{real}\left(\frac{\Delta El(V_{offset})}{\text{Sum}(V_{offset})}\cos(\phi_{EL})\right) = \text{V-offset monopulse curve}$$

where
$\Delta Az(U_{offset})$=Delta-Azimuth U-cardinal plane gains as a function of $U_{offset}$
$\text{Sum}(U_{offset})$=Sum U-cardinal plane gains as a function of $U_{offset}$
$\Delta El(V_{offset})$=Delta-Elevation V-cardinal plane gains as a function of $V_{offset}$
$\text{Sum}(V_{offset})$=Sum V-cardinal plane gains as a function of $V_{offset}$
$\phi_{AZ}$=phase angle between the sum and azimuth difference channels
$\phi_{EL}$=phase angle between the sum and elevation difference channels A resolver transducer is a rotary position sensor that is used to measure an antenna's Rotate angle also known as a Yaw angle (see FIG. 4). The antenna's rotation rate (also known as the scan rate) can be calculated from successive resolver measurements. Typically, a rotating radar will measure the antenna's Rotate angle and calculate its scan rate just prior to executing a dwell. The antenna's mid-CPI Rotate angle can then be estimated as:

RotateMid*CPI*=RotateMeasured+(*T_Mid_CPI–T_Measured*)×Scan_Rate

Where
RotateMidCPI=The estimated mid-CPI Rotate angle in radians.
RotateMeasured=The Rotate angle, in radians, measured by the resolver just prior to executing the dwell.
T_Mid_CPI=The mid-CPI time of the dwell in seconds.
T_Measured=The time at which RotateMeasured was measured in seconds.
Scan_Rate=The antenna's rotation rate calculated from recent resolver measurements in radians per second.

The target's NWU azimuth and elevation angles, denoted as Az_Tgt and El_Tgt, respectively, can be calculated in the following manner:

1) Use SMCI monopulse curves or polynomials to generate accurate estimates of the target's U, V coordinates in sine-space, denoted as $U_{Tgt}$ and $V_{Tgt}$, respectively. Calculate $W_{Tgt}$ as $$W_{Tgt} = \sqrt{1 - U_{Tgt}^2 - V_{Tgt}^2}$$

2) Estimate RotateMidCPI using resolver measurements taken just prior to executing the dwell.
3) Transform the target's sine-space coordinates to normalized NWU coordinates, denoted as $(X_n, Y_n, Z_n)$, using the following coordinate system transformation:

$$\begin{bmatrix} X_n \\ Y_n \\ Z_n \end{bmatrix} = \begin{bmatrix} -\sin(RotateMidCPI) & -\cos(RotateMidCPI)\sin(Tilt) & \cos(RotateMidCPI)\cos(Tilt) \\ \cos(RotateMidCPI) & -\sin(RotateMidCPI)\sin(Tilt) & \sin(RotateMidCPI)\cos(Tilt) \\ 0 & \cos(Tilt) & \sin(Tilt) \end{bmatrix} \begin{bmatrix} U_{Tgt} \\ V_{Tgt} \\ W_{Tgt} \end{bmatrix}$$

4) Calculate the target's NWU azimuth (Az_Tgt) and elevation (El_Tgt) using the equations below:

$$Az\_Tgt = \arctan(Y_n/X_n)$$

$$El\_Tgt = \arctan(Z_n/(X_n^2+Y_n^2))$$

Computer simulations were performed in the MATLAB programming language to compare the performance of the SMCI monopulse curves against conventional monopulse curves when both are used by a rotating radar. The antenna that was simulated was a rectangular array. The following parameters were used to simulate the radar:
Antenna Scan Rate=30 RPM
Antenna Tilt=20 degrees
Center Frequency=10 GHz
CPI Length=2.34 msecs
Sampling Period=0.02 msecs
Number of Array Element Columns=128
Number of Array Element Rows=128
Element-to-Element Spacing=1.5 cm
The simulated one-way antenna patterns had the following array weights:
Transmit Pattern: Uniform weights on azimuth and elevation.
Sum Pattern: 30 dB, $\bar{n}$=5 Taylor weights on azimuth and elevation.
Delta-Azimuth Pattern: 30 dB, $\bar{n}$=5 Bayliss weights on azimuth, and uniform weights on elevation.
Delta-Elevation Pattern: 30 dB, $\bar{n}$=5 Bayliss weights on elevation, and uniform weights on azimuth.

The beam was steered to the following position in sine-space:

$$U_{beam} = 0 \text{ sines}$$

$$V_{beam} = -0.3 \text{ sines}$$

Two-way normal gain antenna patterns were simulated with the specified array parameters and weights. These simulated antenna patterns along with the specified scan rate, antenna tilt, center frequency, CPI length, sampling period and beam steer provided the inputs to the algorithm described in Tables 1, 2 and 3. The output of the algorithm was a set of two-way average gain Sum, Delta-Azimuth and Delta-Elevation antenna patterns.

Referring to FIGS. 9 and 10, U-offset and V-offset monopulse curves were calculated from the normal and average gain patterns. U-offset monopulse curves were calculated by taking the real part of the Delta-Azimuth U-cardinal plane gains divided by the Sum U-cardinal plane gains. V-offset monopulse curves were calculated by taking the real part of the Delta-Elevation V-cardinal plane gains divided by the Sum V-cardinal plane gains. The curves were calculated over the 6-dB beamwidth of the one-way Sum pattern. The U-offset and V-offset monopulse curves are shown in FIGS. 9 and 10, respectively. In the figures, the SMCI monopulse curves are identified as "Average Gain" monopulse curves since they were derived from average gain patterns.

Ninth-order polynomials of the following forms were fit to the monopulse curves:

$$U_{offset} = a_0 + a_1 r_U + a_2 r_U^3 + a_3 r_U^5 + a_4 r_U^7 + a_5 r_U^9$$

$$V_{offset} = b_0 + b_1 r_V + b_2 r_V^3 + b_3 r_V^5 + b_4 r_V^7 + b_5 r_V^9$$

The method of least squares was used to calculate the polynomial coefficients $a_0, a_1, \ldots, a_5$ and $b_0, b_1, \ldots, b_5$. To generate noisy monopulse ratios, 100,000 targets were uniformly distributed over the 6-dB beamwidth of the receive Sum pattern. These noiseless targets were then tracked through the two-way sum and difference patterns and coherently integrated. Gaussian noise was added to the SMCI sum and difference channel returns to produce a desired, average SNR ratio. Monopulse ratios were formed and inserted into the monopulse polynomials to calculate the U, V offsets. Measurement error is defined and calculated as the difference between the measured U, V offsets and the true U, V offsets. The mean and standard deviation of the measurement errors are computed and plotted as a function of SNR. Mean measurement error is also called the bias error, and the error's standard deviation is commonly called the one-sigma accuracy.

Figure 12:
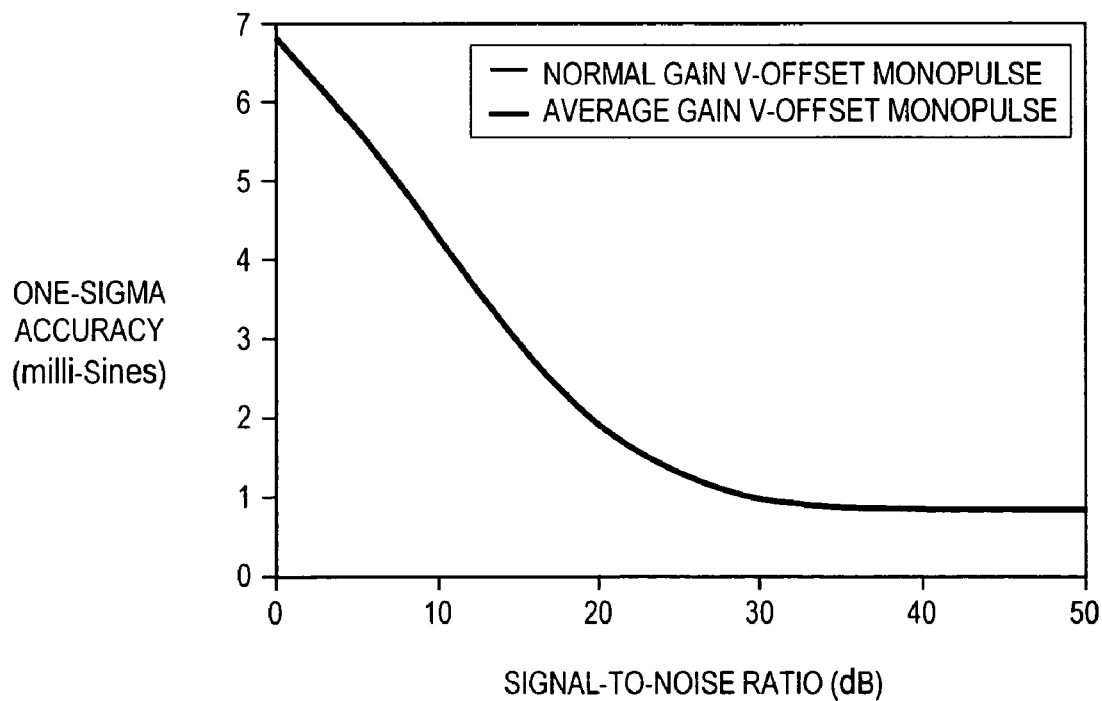
FIG. 12 is a graph showing the one-sigma accuracy performance of the V-offset monopulse curves of FIG. 10.
Figure 13:
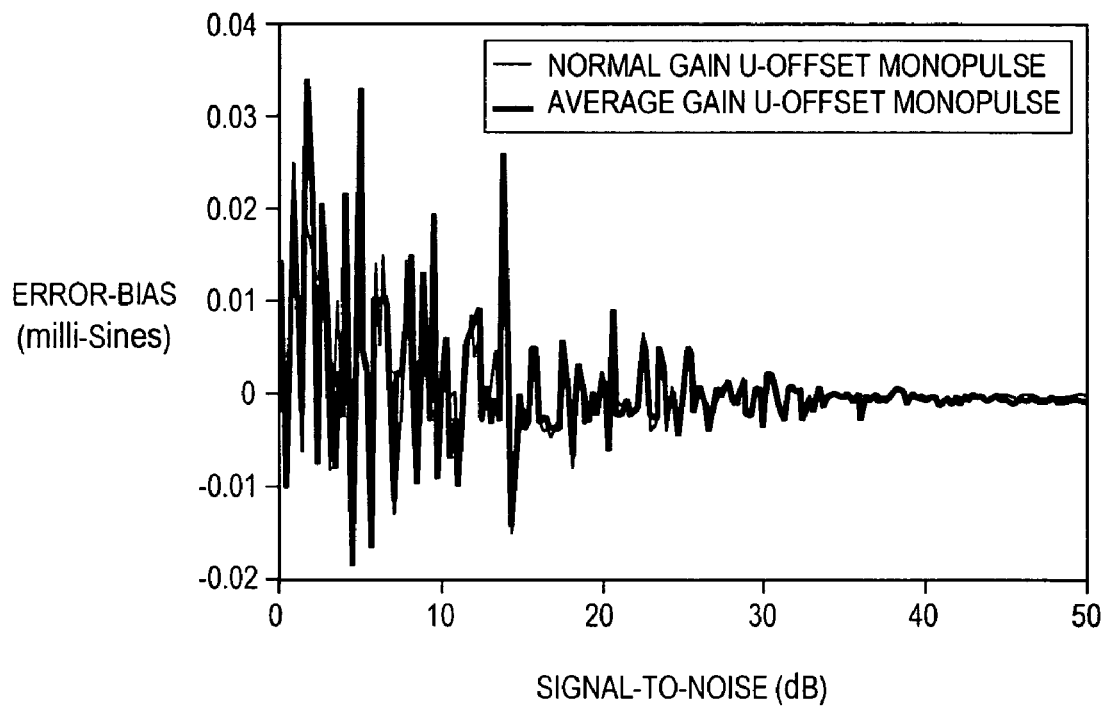
FIG. 13 is a graph showing the error biases of the U-offset monopulse curves of FIG. 9.
Figure 14:
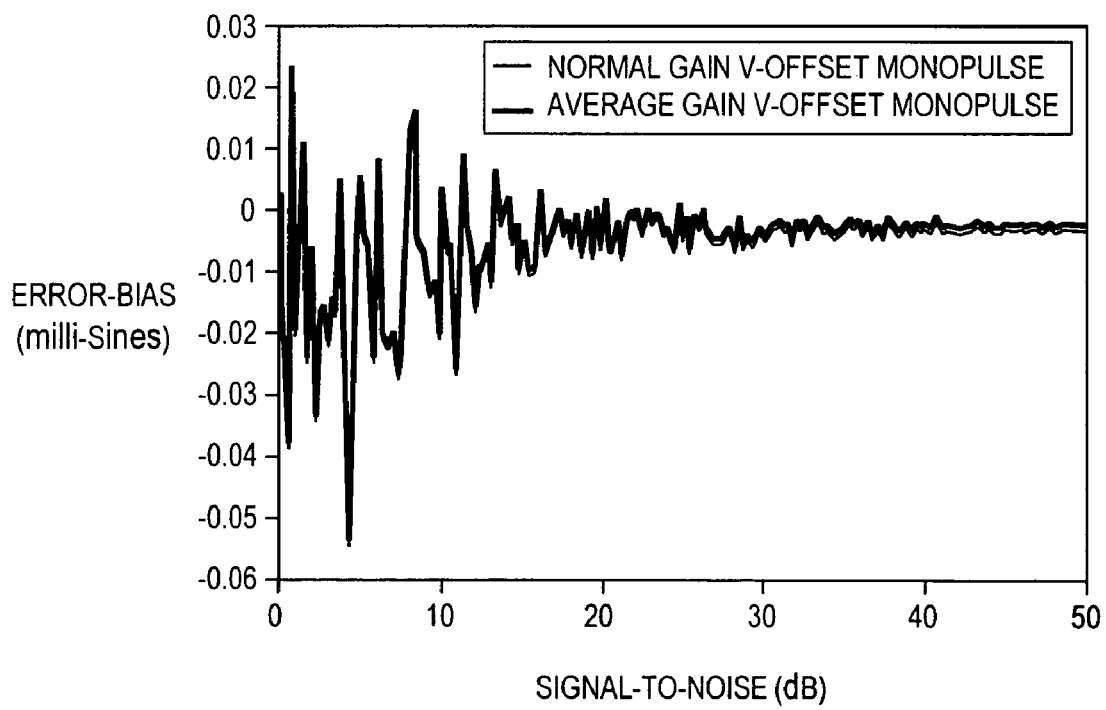
FIG. 14 is a graph showing the error biases of the V-offset monopulse curves of FIG. 10.

Referring to FIGS. 11-14, FIG. 11 is a graph showing the one-sigma accuracy performance of the U-offset monopulse curves of FIG. 9, and FIG. 12 shows the one-sigma accuracy performance of the V-offset monopulse curves of FIG. 10. FIG. 13 is a graph showing the error biases of the U-offset monopulse curves of FIG. 9, and FIG. 14 is a graph showing the error biases of the V-offset monopulse curves of FIG. 10. In the plot legends, "Average Gain" is synonymous with "SMCI". FIGS. 13 and 14 reveal that all the monopulse polynomials had negligible error biases. From FIG. 11 it is apparent that the U-offset SMCI monopulse polynomial provides 2 mrad one-sigma accuracy at 22 dB SNR while the normal gain monopulse polynomial requires 29 dB SNR to give the same level of performance. Therefore, for this particular scenario, the SMCI approach is worth 7 dB of SNR. From FIG. 12, it is clear that the V-offset SMCI monopulse polynomial and the normal gain monopulse polynomial performed equivalently. This is the result of the two V-offset monopulse curves being nearly identical as shown in FIG. 10. The reason the V-offset monopulse curves are nearly the same is a consequence of the sine-space target return trajectories for this particular antenna tilt angle and beam steer. FIG. 8 reveals that when $U_{beam}=0$ and $V_{beam}=-0.3$, the radar beam is steered just above the horizon and the target return trajectories are nearly parallel to the U-coordinate axis. Therefore, when the antenna patterns are coherently integrated and averaged to produce average gain patterns they are integrated along paths that are virtually parallel to the U-coordinate axis. The result is a large change in the antenna gains in the U-cardinal plane and almost no change in the antenna gains in the V-cardinal plane. Consequently, the U-offset monopulse curve is greatly changed by the SMCI process but the V-offset monopulse curve is not.

This invention has been disclosed in terms of a preferred embodiment. It will be apparent that many modifications can be made to the disclosed method without departing from the invention. Therefore, it is the intent of the appended claims to cover all such variations and modifications as come within the true spirit and scope of this invention.

What is claimed is:

1. A method for generating accurate estimates of a radar target's azimuth and elevation angles for a rotating monopulse radar comprising the steps of:
    measuring an antenna's one-way transmit pattern and three receive antenna patterns;
    generating two-way Sum, Delta-Azimuth and Delta-Elevation antenna patterns;
    translating the coordinates of two-way Sum, Delta-Azimuth and Delta-Elevation antenna patterns to center on a sine-space beam steer;
    sampling uniformly the two-way antenna patterns at mid-CPI points of numerous target returns;
    coherently integrating over the sine-space trajectories of said target returns;
    averaging coherent integration sums of said target returns and plotting said averages at their respective mid-CPI points to produce average gain antenna patterns;
    generating U-offset and V-offset scan modulated coherently integrated (SMCI) monopulse curves from average gain patterns;
    coherently integrating said two-way Sum, Delta-Azimuth and Delta-Elevation target returns of said antenna patterns;
    calculating the target's monopulse ratios from said coherently integrated target return measurements;
    calculating the target's U-offset and V-offset monopulse angles in sine-space using said SMCI monopulse curves;
    adding said U-offset and V-offset monopulse angles to a sine-space beam steer to obtain an improved estimate of a target's sine-space position denoted as $U_{tgt}$ and $V_{tgt}$; and
    transforming said $U_{tgt}$ and $V_{tgt}$ to azimuth and elevation angles in a non-rotating coordinate system using coordinate system transformations.

2. The method as recited in claim 1 wherein said step of measuring an antenna's one-way transmit pattern and three receive antenna patterns comprises the step of expressing such measurements in a sine-space coordinate system.

3. The method as recited in claim 1, wherein said step of measuring said three receive antenna patterns includes obtaining one-way Sum, Delta-Azimuth, and Delta-Elevation patterns.

4. The method as recited in claim 1 wherein:
    said step of transforming said estimates of a target's sine-space position, $U_{tgt}$ and $V_{tgt}$, to azimuth and elevation angles in a non-rotating coordinate system comprises the steps of:
    calculating $W_{tgt}$ as $$W_{tgt} = \sqrt{1 - U_{tgt}^2 - V_{tgt}^2}$$

estimating the antenna's mid-CPI rotation angle (yaw angle) using resolver transducer measurements taken just prior to the dwell; and
    transforming said target's sine-space coordinates $U_{tgt}$, $V_{tgt}$ and $W_{tgt}$ to normalized north-west-up (NWU) coordinates $(X_n, Y_n, Z_n)$ using knowledge of the antennnals rotation and tilt angles at mid-CPI; and
    calculating said target's NWU azimuth angle (Az_Tgt) and elevation angle (El_Tgt) using the following relationships:

$$Az\_Tgt = \arctan\left(\frac{Y_n}{X_n}\right); \text{ and}$$

$$El\_Tgt = \arctan\left(\frac{Z_n}{\sqrt{X_n^2 + Y_n^2}}\right).$$

5. The method as recited in claim 1 wherein said method comprises the step of fitting polynomials to said monopulse curves using a method of least squares.

6. A method for generating scan modulated coherently integrated (SMCI) monopulse curves comprising the steps of:
    measuring an antenna's one-way transmit pattern and three receive antenna patterns;
    generating two-way Sum, Delta-Azimuth and Delta-Elevation antenna patterns by performing a point by point multiplication of the antenna gain of the one-way transmit pattern with the antenna gains of the three receive patterns;
    translating the coordinates of two-way Sum, Delta-Azimuth and Delta-Elevation antenna patterns to center on a sine-space beam steer;
    sampling uniformly the two-way antenna patterns at mid-CPI points of numerous target returns;
    coherently integrating over the trajectories of said target returns;
    averaging coherent integration sums of said target returns and plotting said averages at their respective points; and
    generating scan modulated coherently integrated (SMCI) monopulse curves from the Sum, Delta-Azimuth and Delta-Elevation average gain antenna patterns as follows:

generating a U-offset SMCI monopulse curve by taking the real parts of the Delta-Azimuth U-cardinal plane gains divided point-by-point by the Sum U-cardinal plane gains; and generating a V-offset SMCI monopulse curve by taking the real parts of the Delta-Elevation V-cardinal plane gains divided point-by-point by the Sum V-cardinal plane gains.

7. The method as recited in claim 6 wherein said step of measuring an antenna's one-way transmit pattern and three receive antenna patterns comprises the step of expressing such measurements in a sine-space coordinate system.

8. The method as recited in claim 6 wherein said step of measuring said three receive antenna patterns includes obtaining one-way Sum, Delta-Azimuth, and Delta-Elevation patterns.

9. The method as recited in claim 6 wherein said method comprises the step of fitting polynomials to said SMCI monopulse curves using a method of least squares.

10. A method for applying SMCI monopulse polynomials to target returns and determining azimuth and elevation angles in a non-rotating coordinate system comprising the steps of:

coherently integrating two-way Sum, Delta-Azimuth and Delta-Elevation target returns;

calculating the target's U-offset and V-offset monopulse ratios from said coherently integrated target return measurements;

calculating the target's U-offset and V-offset monopulse angles in sine-space using said SMCI monopulse polynomials;

adding said U-offset and V-offset monopulse angles to a sine-space beam steer to obtain an improved estimate of a target's sine-space position denoted as $U_{tgt}$ and $V_{tgt}$; and transforming said $U_{tgt}$ and $V_{tgt}$ to azimuth and elevation angles in a non-rotating coordinate system using knowledge of the antenna's yaw and tilt angles and coordinate system transformations.

11. The method as recited in claim 10 wherein:

said step of transforming said estimates of a target's sine-space position, $U_{tgt}$ and $V_{tgt}$, to azimuth and elevation angles in a non-rotating coordinate system comprises the steps of:

transforming said target's sine-space coordinates to normalized north-west-up (NWU) coordinates ($X_n, Y_n, Z_n$) and calculating said target's NWU azimuth angle (Az_Tgt) and elevation angle (El_Tgt) using the following relationships:

$$Az\_Tgt = \arctan\left(\frac{Y_n}{X_n}\right); \text{ and}$$

$$El\_Tgt = \arctan\left(\frac{Z_n}{\sqrt{X_n^2 + Y_n^2}}\right).$$

12. A method of producing an average gain pattern for a rotating radar employing coherent integration comprising the steps of:

storing a measured two-way antenna pattern with U and V sine-space coordinates;

translating said antenna coordinates to center on a beam steer;

calculating a W component of said antenna pattern coordinates;

calculating the number of samples in a coherent processing interval (CPI);

calculating a yaw angle scanned in a sampling period;

calculating said yaw angle scanned in said CPI;

calculating a starting yaw angle with respect to the NWU X-axis;

calculating mid-CPI points of numerous target returns in a NWU frame;

coherently integrating over trajectories of said target returns for integration steps one to number of samples in a CPI; and averaging said coherently integrated pattern of said target returns to obtain an average gain pattern.

13. The method as recited in claim 12 wherein said coherently integrating over trajectories of said target returns comprises the steps of:

determining the antenna yaw angle at each integration step;

calculating sine-space trajectories of said target returns;

interpolating the two-way antenna patterns at said trajectory points; and coherently integrating by summing the antenna pattern gains at each point in the sine-space trajectories of said target returns and plotting the sums at the mid-CPI points of their respective sine-space trajectories; and averaging said coherently integrated antenna patterns by dividing the antenna pattern gains by the number of samples in a CPI to produce an average gain two-way antenna pattern.

14. A phased-phased array rotating radar system comprising:

a phased-phased array rotating antenna;

an antenna electronics unit for sending and receiving signals to and from said phased-phased array rotating antenna wherein the direction of radar beams transmitted by said antenna are electronically controlled;

means connected to said antenna electronics unit for processing target return signals and generating transmit command signals;

a signal and data processor for generating estimates of a target azimuth angle and elevation angle including means for pulse compression of target return signals;

means for coherent integration of compressed pulses;

means for detection processing of said coherently integrated compressed pulses;

means for monopulse processing of detected signals;

means for target tracking;

means for generating array beam steering commands;

a beam steering generator connected to said signal and data processor for generating beam steering commands for said antenna electronics unit;

said signal and data processor for generating estimates of a target azimuth angle and elevation angle comprises means for generating scan modulated monopulse curves from average gain patterns, means for calculating a target's monopulse ratios, means for calculating said target's U-offset and V-offset monopulse angles, means for adding said U-offset and said V-offset monopulse angles to a sine-space beam steer obtaining estimates of said target's angular position ($U_{tgt}$ and $V_{tgt}$); and means for transforming said estimates $U_{tgt}$ and $V_{tgt}$ to said azimuth and elevation angles in a non-rotating coordinate system.

* * * * *